Figure 1:
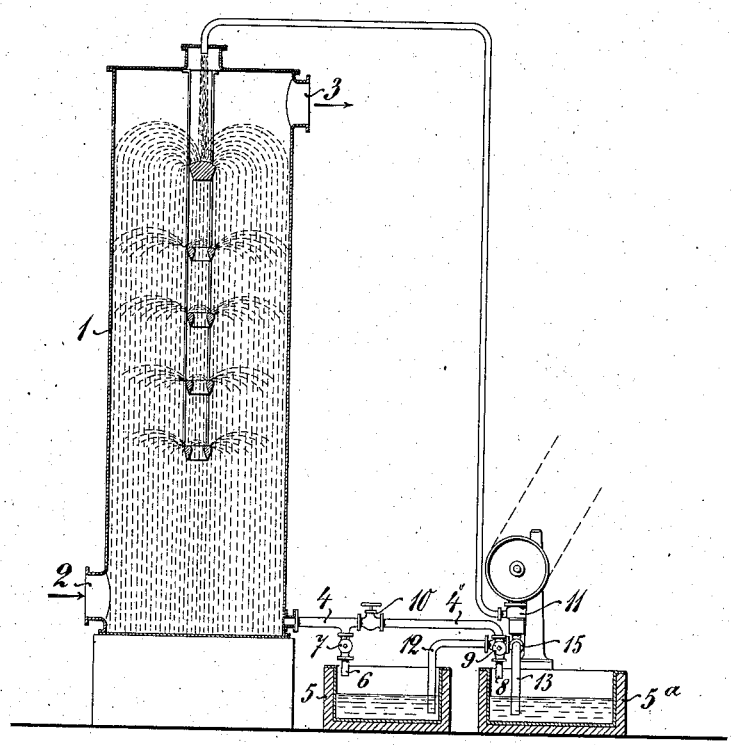

No. 824,092. PATENTED JUNE 26, 1906.
R. BRUNCK.
PROCESS OF EXTRACTING AMMONIA FROM GASES.
APPLICATION FILED NOV. 18, 1904.

Witnesses
Inventor
Rudolph Brunck

ATTORNEY.

UNITED STATES PATENT OFFICE.

RUDOLPH BRUNCK, OF DORTMUND, GERMANY.

PROCESS OF EXTRACTING AMMONIA FROM GASES.

No. 824,092.　　　　Specification of Letters Patent.　　　Patented June 26, 1906.

Application filed November 18, 1904. Serial No. 233,337.

*To all whom it may concern:*

Be it known that I, RUDOLPH BRUNCK, doctor of philosophy, a subject of the King of Bavaria, residing at Dortmund, Kingdom of Prussia, German Empire, (and whose post-office address is No. 14 Prinz Friedrich Carl strasse, Dortmund,) have invented a new and useful Process of Extracting Ammonia from Distillation-Gases; and I do hereby declare that the following is a full, clear, and exact description of my invention, which will enable others skilled in the art to which it appertains to make and use the same.

This invention relates to the extraction of ammonia and compounds thereof from the gases evolved during the dry distillation of coal, brown coal, wood, peat, and other substances, said gases being acted upon in their raw and hot state with concentrated acid immediately after leaving the distillation apparatus.

According to a prior invention of mine described in United States Letters Patent No. 773,784, November 1, 1904, the raw hot gases are conducted through concentrated acid in an open washer at such a temperature that the separation of solid ammonia salt takes place within the washer, the deposit being baled out from time to time. This mode of proceeding is to a certain degree not quite perfect, inasmuch as repeated washing is required, especially with gases rich in ammonia, to avoid losses of ammonia, the period of contact between the gas and the acid being rather short.

It is the purpose of my present invention to do away with this deficiency, and to this end it essentially consists in proceeding as follows: The raw and hot gases are washed with concentrated acid—for instance, sulfuric acid—in a closed scrubber or other kind of closed washer, whereby the gas is caused to meet the acid in counter-current. The washing-operation is so conducted that a concentrated hot solution of ammonia will be obtained in the acid, deposits of ammonia salt in the washer being avoided, so that all of the ammonia absorbed is retained in the outflowing hot liquor. This may easily be reached by properly adjusting the temperature within the washer or the quantity of acid used or the speed with which the acid is caused to pass through the washer, as is well known to those skilled in the art of treating gases with liquid. The outflowing hot liquor is received in a refrigerating apparatus or cooler, where it is cooled to such a degree that all or most of the ammonia salt is caused to separate from the acid and to settle on the bottom. The overplus of acid is drawn off by means of a pump and raised back on the washer. At a suitable point fresh acid is added to compensate the amount of acid absorbed by the ammonia. It is preferred to carry out the described process by the aid of a series of coolers which are alternately connected with the scrubber or other closed washer, so that the process can be carried out on the continuous-acting system.

Figure 2:
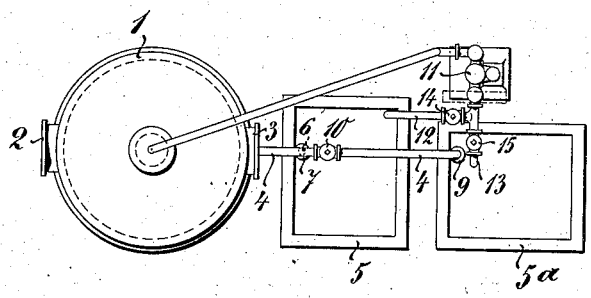
Figure 2:

On the annexed sheet of drawings is illustrated one combination of apparatus adapted for my present invention, Figure 1 being a vertical central section, and Fig. 2 a plan.

1 is a scrubber of well-known construction, whereby the absorbing acid is caused to form a series of superposed showers. The raw and hot distillation-gas enters the scrubber through the inlet-opening 2 at the bottom of same, and the washed gas escapes at the top through the outlet-opening 3. The solution of acid and ammonia salt formed collects in the bottom part of the scrubber and is conducted through pipe 4 into one of a series of open coolers. In the drawings two coolers 5 and 5ª are shown. The cooler 5 is connected with the supply-pipe 4 through a pipe 6, having a cock 7, and the cooler 5ª is connected with said supply-pipe through a pipe 8, having a cock 9. Between the pipes 6 and 8 the supply-pipe is provided with a cock 10. From the suction side of a pump 11 are branched off two pipes 12 and 13, of which pipe 12, having a cock 14, communicates with the cooler 5, and pipe 13, having a cock 15, communicates with the cooler 5ª.

Supposing the cocks 10, 14, and 9 to be closed and the cocks 7 and 15 to be opened, with this adjustment of said cocks the cooler 5 will be supplied with liquor from the scrubber 1, while acid is drawn from the cooler 5ª by the pump 11 and raised back on the top of said scrubber. When the cooler 5 is filled with liquor, cocks 7 and 15 are closed and cocks 10, 14, and 9 opened. Fresh liquor passes from the scrubber into the cooler 5ª, and acid is drawn from the cooler 5 and raised back on the top of the scrubber. When cooler 5ª is filled again, the said cocks are reverted to their former position, and so on. The salt deposited in the coolers is baled out at suitable intervals.

It is evident to those skilled in the art that many other combinations of apparatus may be used for carrying out the present invention, which therefore does not reside in the apparatus, but in the mode of operation, as described.

What I claim as my invention is—

The herein-described process for the extraction of ammonia from gases evolved in the dry-distillation process which consists in washing the raw hot gases with concentrated acid in a scrubber, regulating the absorption of the ammonia so that the solution formed does not become oversaturated, withdrawing from the scrubber the hot solution and cooling the same, substantially as and for the purpose stated.

In testimony whereof I have hereunto set my hand in presence of two subscribing witnesses.

RUDOLPH BRUNCK.

Witnesses:
PETER LIEBER,
WILLIAM ESSENWEIN.